(12) United States Patent
Chyou et al.

(10) Patent No.: US 8,343,430 B2
(45) Date of Patent: Jan. 1, 2013

(54) COMPACT TWO-STAGE GRANULAR MOVING-BED APPARATUS

(75) Inventors: Yau-Pin Chyou, Taipei (TW); Jiri Smid, Prague (DK); Shu-San Hsiau, Taoyuan County (TW); Chia-Wei Chang, Changhua County (TW); Ta-Ching Huang, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 133 days.

(21) Appl. No.: 13/087,066

(22) Filed: Apr. 14, 2011

(65) Prior Publication Data

US 2012/0213675 A1    Aug. 23, 2012

(30) Foreign Application Priority Data

Feb. 22, 2011    (TW) .................................. 100105714

(51) Int. Cl.
*B01D 50/00*    (2006.01)
*B01D 51/00*    (2006.01)
*B01J 8/08*    (2006.01)

(52) U.S. Cl. ........ 422/177; 422/169; 422/173; 422/216; 96/131; 96/150; 55/474; 55/467.1

(58) Field of Classification Search .................. 422/169, 422/173, 177, 216; 96/131, 150; 55/474, 55/467.1
See application file for complete search history.

(56) References Cited

U.S. PATENT DOCUMENTS

| | | | |
|---|---|---|---|
| 4,400,363 A | 8/1983 | Grochowski et al. | |
| 4,482,358 A * | 11/1984 | Hsieh et al. | ........................ 48/77 |
| 5,053,210 A | 10/1991 | Buxel et al. | |
| 7,132,088 B2 | 11/2006 | Smid et al. | |
| 8,142,730 B2 * | 3/2012 | Smid et al. | ..................... 422/216 |

FOREIGN PATENT DOCUMENTS

| | | |
|---|---|---|
| CN | 1478872 | 3/2004 |
| DE | 2911712 | 9/1980 |
| DE | 3039477 | 5/1982 |
| DE | 3817685 | 11/1989 |
| DE | 4030896 | 4/1992 |

* cited by examiner

*Primary Examiner* — Walter D Griffin
*Assistant Examiner* — Lessanework Seifu
(74) *Attorney, Agent, or Firm* — WPAT PC; Justin King

(57) ABSTRACT

A compact two-stage granular moving-bed apparatus comprises a vessel, a flow-corrective element, and a filter material supplying part. The vessel comprises a hollow interior, a gas outlet, a first media outlet and a second media outlet. The flow-corrective element divides the hollow interior into a first channel and a second channel. The filter material supplying part has a first provider for providing a first granular material flowing through the first channel and a second provider for providing a second granular material flowing through the second channel, wherein a vertical level of each first and second provider is adjustable so that a first flow path that an exhaust gas flows through the first granular material and a second flow path that the exhaust gas flow through the second granular material is respectively capable of being controlled.

20 Claims, 7 Drawing Sheets

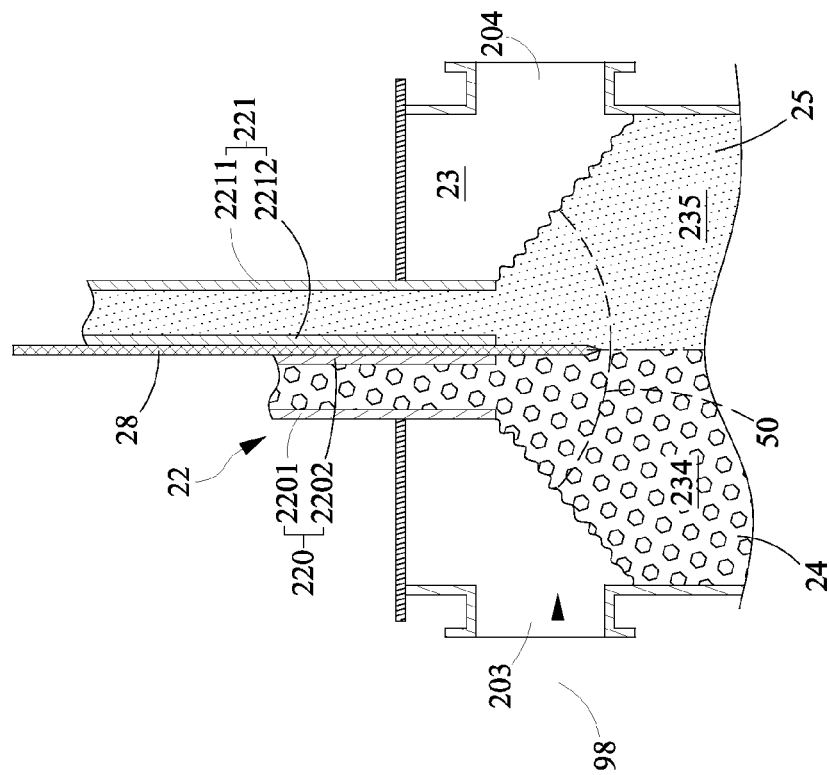
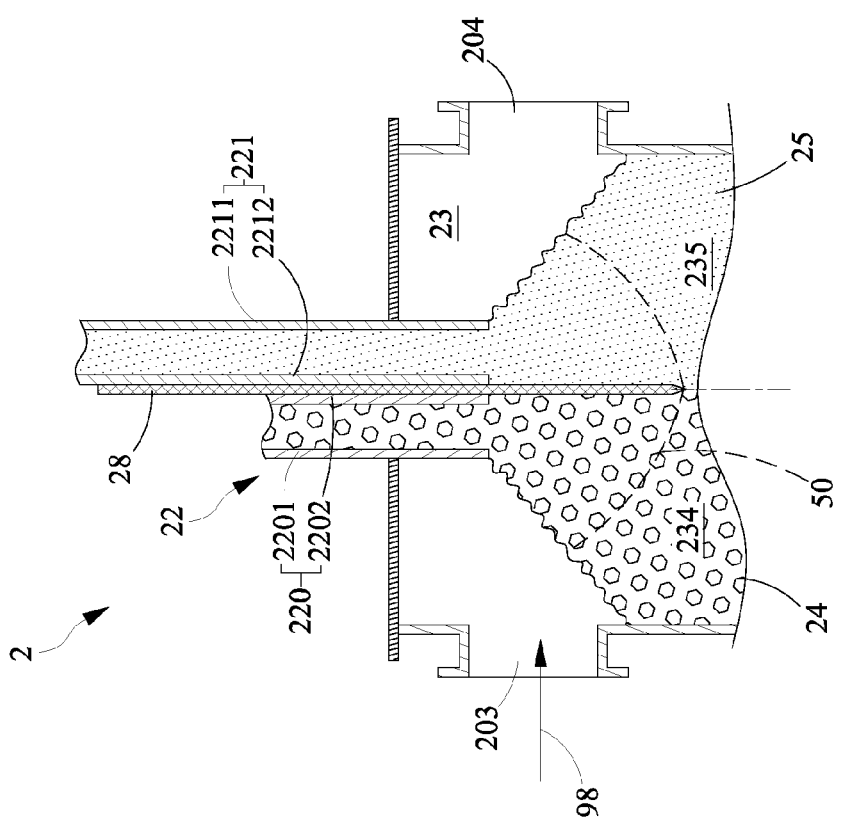

COMPACT TWO-STAGE GRANULAR MOVING-BED APPARATUS

BACKGROUND OF THE INVENTION

1. Field of Invention

The present invention relates to a compact granular moving-bed apparatus, and more particularly to a compact two-stage granular moving-bed filter utilizing different kinds of granular filter media to clean up gas.

2. Related Art

Coal-fired power plants, or metallurgical processes and incineration plants generate high-temperature gas containing a large amount of fly ashes and dusts, sulfides, nitrides or other contaminants, and if the exhaust flue gas or raw syn-gas is emitted without processing, the environment of mankind will be affected seriously. In order to solve the environmental pollution problems due to hazardous gases, industrial countries have to constitute strict emission standards, and also input considerable research and development (R&D) resources to investigate how to remove the harmful pollutants in the gas streams effectively so as to conform to the emission standards.

In prior art, many methods of gas cleanup exist, among which some methods are common, namely mechanical separation of dust in cyclones, electrostatic dust collecting, baghouse filters, ceramic candle filters, granular moving-bed filters, etc. Cyclones are considered to be powerful and cheap pre-separators for gas cleanup purposes. Their removal efficiency is, however, limited to about 90% and rapidly deteriorates for particles smaller than 10 microns.

In the most widely used electrostatic dust precipitators, corona is utilized to ionize the exhaust gas so as to make the harmful materials carrying negative charges, and these materials are then caught on earthed collector plates to achieve the objective of gas cleanup. Electrostatic precipitators can be operated economically in flue gases of large volumes, but their efficiency is influenced by effects of chemical composition of particles, particle electric resistivity, moisture content, and temperature of gas.

Furthermore, another baghouse filter dust collecting technique also achieves the effect of gas cleanup through retaining the harmful materials in the exhaust gas, passing through the baghouse filter fabric. The baghouse filters offer very high dust collection efficiency and, operating in low temperature, they have the advantage over electrostatic dust precipitators, that the electric resistivity of dust particles does not play any role, making them competitive for high-resistivity ashes. Particles of different size are removed by different physical mechanisms in baghouse filters. The highest removal efficiencies are obtained for the large particles at high gas velocities and for the finest particles at low velocities. Baghouse filters can work at higher temperatures, depending on fabric materials. Ceramic materials, usually based on alumina, quartz or aluminum silicates are the best choice. A disadvantage when compared with electrostatic dust precipitators is the larger pressure drop and relatively low gas face velocity. Low gas face velocity gives rise to large filtration surface and inherently high costs.

Ceramic candle filters have been and are still being tested at full scale operation at several IGCC demonstration projects. Filter cleaning is done by backpulsing usually with nitrogen. Typical problems encountered during the testing are the breakage and strength degradation of ceramic candles owing to the overheating, thermal shocks and excessive pressure drop. In addition, the plenum vibration and back-pulse cleaning expose the candle filters to thermal and mechanical fatigue stresses that may ultimately lead to fracture of the filter elements.

Granular moving-bed (GMBFs) filters are very well suitable for high temperature gas filtration. They are developed as key subsystems of current integrated gasification combined cycle (IGCC) and advanced pressurized fluidized bed combustion (PFBC) power generation systems. Their potential economic advantage is based on the fact that the GMBFs may be more compact than either electrostatic precipitators or baghouse filters. GMBFs usually consist of rectangular panels with louver-like side-walls and granular moving bed is sandwiched between them. The principal disadvantage of these filters is that either a very thick bed or very fine granular material (or both) are required to give high removal efficiency of particulates in the 0.5 to 10 microns size range. The requirement for thick beds results in large expensive equipment, while the use of very fine granular material causes high pressure drop, poor bed flow characteristics, accompanied by stagnant zones and hot spots in granular moving bed, causing corrosion and plaques on louver wall. Flow patterns in moving bed are influenced by friction of filter media on louver walls. It results in uprise of stagnant zones alongside louver walls. Besides particulate removal, granular moving beds may be able to capture other contaminants through the use of other materials (such as sorbent, activated carbon, etc.), in two stage process, but in one apparatus.

In order to improve the removal efficiency of granular moving bed filters, and extend the options in which the granular filter media can be applied, the technologically developed countries are devoted to research and development of environmental-friendly gas cleanup technologies, and so far, the granular moving-bed filter is a highly regarded gas cleanup apparatus, and can be considered as the exhaust gas cleanup apparatus widely used in the future. FIG. 1 is a schematic view of a common granular moving-bed filter with louver-like side walls. Referring to FIG. 1, the granular moving-bed filter is constituted by a plurality of hopper-shaped structures 16, and each hopper-shaped structure 16 has louver walls 10 and 11 at two sides thereof. The granular material, serving as the filter medium, enters from the top of the granular moving-bed, so that the granular material 15 goes down along the hopper-shaped structure 16 as the moving barrier of granules to catch and to clean up the harmful substances in the exhaust gas stream passing through the granular material, and the granular material which has adsorbed impurity or lost filtering effect exits from the bottom of the granular moving-bed. In FIG. 1, the raw syn-gas or exhaust gas flow 90 enters the granular moving-bed from the louver wall 10 at inlet side of the granular moving-bed, and passes through the filter medium 15. The harmful or polluting material contained in the exhaust gas flow 90 is filtered out by the filter medium 15, and the clean gas flow 91 exits from the louver wall 11 at the outlet side of the granular moving-bed.

FIG. 2 is a schematic view of the granular moving-bed filter generating stagnant zones as prevailing phenomenon in granular moving-bed filters. Similarly, the exhaust gas flow 90 enters the granular moving-bed via the louver wall 10, and the clean gas flow 91 exits the louver wall 11. However, in the prior art, when flowing in the flow path, the granular material 15 generates kinematic friction with the louver walls 10 and 11, so that the granular flow generates a central fast-flowing zone 12, a quasi-stagnant zone 13, and a stagnant zone 14 in the flow path. When the stagnant zones are formed alongside the louver walls 10 and 11, because the granules are not moving, the dust filtered will deposit on the inlet side of the granular moving-bed, and gradually plug the exhaust gas flow 90 from flowing through, thereby affecting the efficiency of filtering and generating the clean gas flow 91. As the same stagnant zone uprises on louver wall 11, the gas pressure drop in moving bed increases, resulting in an unacceptable value of pressure drop across the filter. While both stagnant zones 14 are formed, the area of granular moving-bed capable of removing impurities from exhaust gas flow 90 decreases, velocity of exhaust gas flow 90 increases over recommended filtration velocity in reduced granular zone of filtration, and a process of filtration is destroyed. Thus, some methods and designs of granular moving-beds are sought to diminish stagnant zones 14 and expand the fast flowing zone 12 into mass flow.

For example, in the prior art, U.S. Pat. No. 7,132,088 discloses a granular moving-bed apparatus, which utilizes filter medium flowing in granular moving-bed with internal saddle-roof-shaped flow-corrective elements, so that the granular flow is divided into two streams, characterized by mass flow without stagnant zones, and the problems of the corrosion of the louver walls or stagnant zones in the prior art can be solved by this mass flow design.

Furthermore, DE4030896 discloses a granular moving-bed filter, which utilizes two different moving-beds divided by a hardware structure to clean up exhaust gas. However, the path of the exhaust gas in moving bed is long and changing arrangement of flow from counter-current to co-current or vice versa, and thus the pressure drop of the exhaust gas is high, thereby energy-intensive and affecting the flow rate of the gas. Additionally, DE3817685 discloses a granular moving bed apparatus, which also utilizes two streams of different granular media kept apart by a perforated vertical wall to uniformly distribute and clean up the exhaust gas. In the technique, because the perforated vertical wall, separating the two streams of granules, may be plugged by dust coming with flue gas or by dust from abrasion of granular media. Thus the flow of flue gas through perforated vertical wall is obstructed. In addition, the exhaust gas flow also gives rise to pinning of granular media to the perforated vertical wall. Pinning of granules hampers their smooth sliding along the wall. Also, the exhaust gas flow can create some cavities on the vertical perforated wall which disturb flow of granules and decrease their filter efficiency.

Granular moving-bed filters have been successfully employed in high temperature, high pressure applications. Nevertheless, the cost of such granular moving-bed filters has been relatively high since the vessels most typically are of a cylindrical configuration to withstand the high pressures involved in the application. It is just desired to provide a granular moving-bed filter suitable for use in high temperature, low pressure applications and that can be economically manufactured.

Many granular moving-bed filters are constructed as high vessels with vertical louvered walls. Such equipment suffers from non-uniform and unstable velocity distribution of raw syn-gas on inlet side wall of filter vessel. Thus, some regions of granular moving-bed are loaded with syn-gas and contaminants more than other regions, depending on design of gas inlet side wall of filter. It is thus desired to provide a granular moving-bed filter with simple and compact filter vessel with single raw syn-gas inlet.

Since granular moving-bed filters operate by capturing or trapping gas or vapor-borne contaminants within the granular media, it is understood that such filter cannot remove 100% of any given contaminant in one filtering operation and, depending upon the application, it is thus often necessary to pass the gas through multiple granular moving-bed filters that may employ different granular media or the same type of granular media but of a different particle size to progressively remove incremental amounts of the contaminants from the gas stream. In order to enhance the collection efficiency of granular moving bed filters, a two-stage granular filtration concept was evolved, wherein the filter depth is divided between two stages, accommodated in two separate vertically mounted units (e.g. CN 1213131) or where single moving bed filters arranged horizontally act in series (e.g. DE 19651691). But, any two or more units will increase cost of equipment in contradiction with effort to catch up economically manufactured equipment. In addition, patents such as U.S. Pat. No. 4,400,363, U.S. Pat. No. 4,500,501, U.S. Pat. No. 5,053,210, DE 2911712, and DE 3039477 also disclose two stage systems for cleaning the exhaust gas.

It is thus desired to provide a granular moving-bed filter that can combine separated flows of two different granular filter media in the one filter vessel with two moving beds in mass flows of both moving beds, without stagnant zones or with two slight and proportional quasi-stagnant zones, saving walls of filter vessel from attrition, but not decreasing the area of granular moving-bed capable of removing impurities from exhaust gas flow.

Since it is advisable to extend the path of cleaned gas in one of the both moving beds depending on the concentration of contaminants coming with raw gas, it is desired to operate granular moving-bed filter with different levels of granular filter media.

Since the concentration of contaminants coming with raw gas changes in time, it is desired to operate granular moving-bed filter with different flow rates of both granular moving beds.

SUMMARY OF THE INVENTION

The present invention provides a compact two-stage granular moving-bed apparatus, which utilizes two filter media with different purposes and objectives to flow through channels in the moving bed apparatus in a state of continuous mass flow without stagnant zones, so that the contaminant in the exhaust gas entering the moving bed apparatus may be filtered out by forcing gas through the two different filter media which carry contaminant away, thereby increasing the effect of filtration.

The present invention provides a compact two-stage granular moving-bed apparatus, which is capable of adjusting the vertical level of a filter material supplying part so as to adjust the flow path through which the exhaust gas passes.

In an embodiment, the present invention provides a compact two-stage granular moving-bed apparatus, which comprises a vessel, a flow-corrective element, and a filter supplying part. The vessel comprises a hollow interior enclosed by a first side structure, a second side structure, a top side structure and a bottom side structure, and the vessel further includes a gas inlet formed on the first side structure, a gas outlet formed on the second side structure, and a first media outlet and a second media outlet respectively formed on the bottom side structure, wherein the gas outlet, the gas inlet, the first media outlet and the second media outlet are communicated with the hollow interior. The flow-corrective element is disposed inside the hollow interior for dividing the hollow interior into a first channel and a second channel. The filter material supplying part is coupled to the top side structure and has a first provider for providing a first granular material flowing through the first channel and a second provider for providing a second granular material flowing through the second channel, wherein an exhaust gas entering from the gas inlet in turn passes through the first and second granular material and exists from the gas outlet, and a vertical level of each first and second provider is adjustable so that a first flow path that the exhaust gas flows through the first granular material and a second flow path that the exhaust gas flow through the second granular material is respectively capable of being controlled.

In another embodiment, the first channel and the second channel are formed asymmetrically inside the hollow interior. The flow-corrective element has a first flow-corrective plate and second flow-corrective plate, the first side structure has a first hopper wall, and the second side structure has a second hopper wall such that a part of the first channel defined by the first flow-corrective plate and the first hopper wall forms a first convergent mass flow channel while a part of the second channel defined by the second flow-corrective plate and the second hopper wall forms a second convergent mass flow channel.

In another embodiment, the outlet of the first provider is higher than an outlet of the second provider such that a free surface of the first granular material is higher than a free surface of the second granular material, so the first flow path of exhaust gas is longer than the second flow path. The free surface of the second granular material is larger than the free surface of the first granular material. A flow rate of the first granular material in the first channel is faster than a flow rate of the second granular material in the second channel.

In another embodiment, the outlet of the first provider is lower than an outlet of the second provider such that a free surface of the first granular material is lower than a free surface of the second granular material, so the first flow path of exhaust gas is shorter than the second flow path. A flow rate of the first granular material in the first channel is faster than a flow rate of the second granular material in the second channel.

In another embodiment, the first channel and the second channel are formed symmetrically inside the hollow interior. In the embodiment of symmetrical arrangement, a vertical plate is disposed between the first provider and the second provider, and the vertical plate is capable of being moved upwardly and downwardly along a vertical direction in the hollow interior so as to adjust the first flow path and the second flow path. A heat exchanger is disposed inside the vertical plate for cooling or heating the first granular material and the second granular material inside the hollow interior.

In the embodiment of symmetrical arrangement, the flow-corrective element further comprises an upper flow-corrective part having a first flow-corrective plate and a second flow-corrective plate symmetrically arranged on respective side of a z-direction centerline of the flow-corrective element, and a lower flow-corrective part having a third flow-corrective plate and fourth flow-corrective plate symmetrically arranged on respective side of the z-direction centerline of the flow-corrective element, and an end of the first flow-corrective plate is coupled to an end of the third flow-corrective plate, while an end of the second flow-corrective plate is coupled to an end of the fourth flow-corrective plate.

In the embodiment of symmetrical arrangement, the first side structure has a first hopper wall, and the second side structure has a second hopper wall such that a part of the first channel defined by the first flow-corrective plate and the first hopper wall forms a first convergent mass flow channel while a part of the second channel defined by the second flow-corrective plate and the second hopper wall forms a second convergent mass flow channel.

BRIEF DESCRIPTION OF THE DRAWINGS

The present invention will become more fully understood from the detailed description given herein below for illustration only, and thus are not limitative of the present invention, and wherein:

FIG. 7A and FIG. 7B respectively illustrates the flow path control by adjusting the vertical position of the vertical plate.

DETAILED DESCRIPTION OF THE INVENTION

Figure 1:
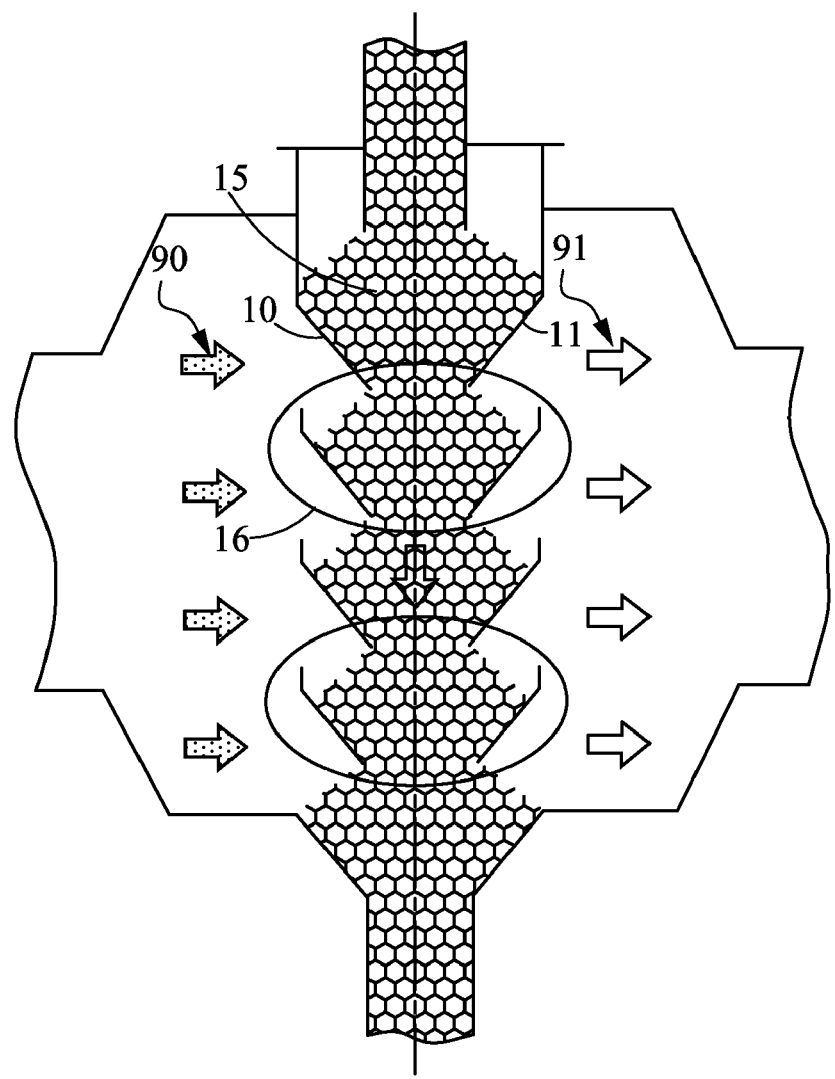
FIG. 1 is a schematic view of a conventional granular moving-bed apparatus with louver walls.
Figure 2:
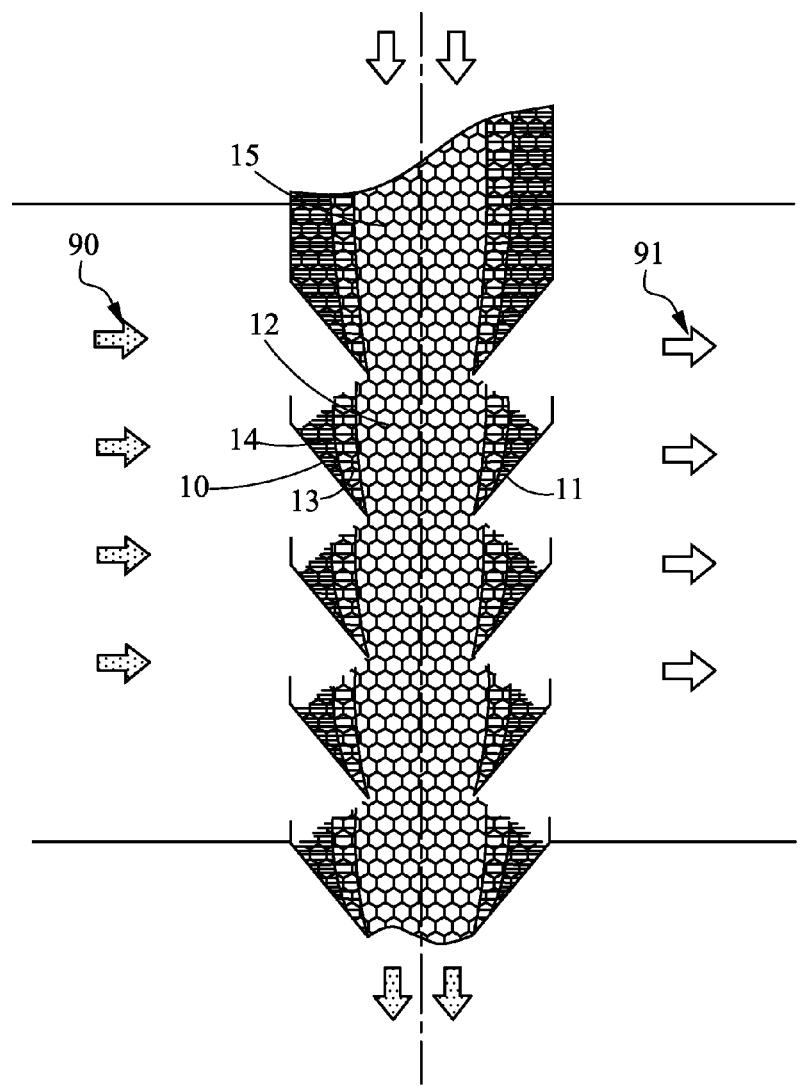
FIG. 2 is a schematic view of a conventional granular moving-bed apparatus generating stagnant zones during granular flow.
Figure 3:
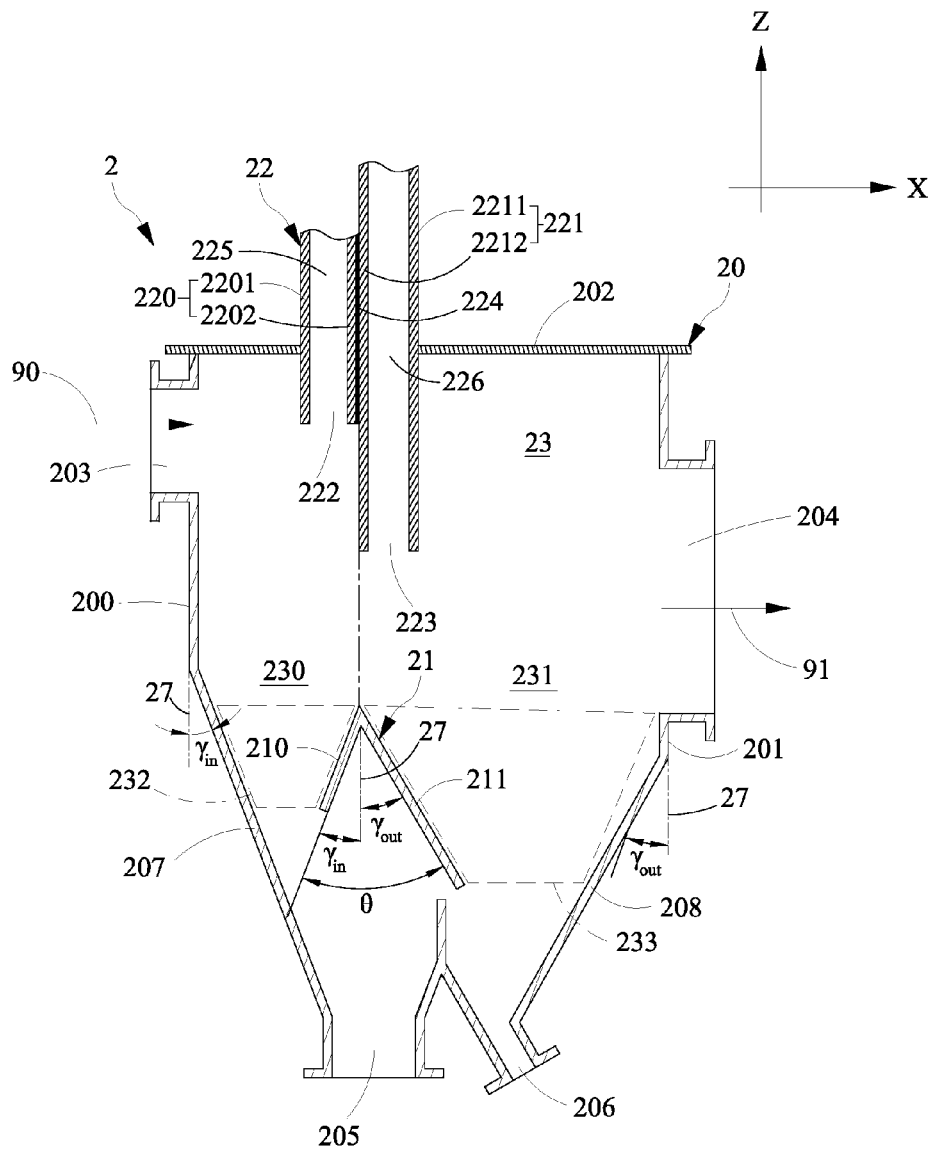
FIG. 3 is a schematic sectional view of a compact two-stage granular moving-bed apparatus according to a first embodiment of the present invention.

In order to make the review committeeman further recognize and understand the features, objectives and functions, illustration below is made about the related detailed structure and the design concept of the apparatus of the present invention below to make the review committeeman understand the characteristics of the present invention, the detailed illustration is as below:

FIG. 3 is a schematic sectional view of a compact two-stage granular moving-bed apparatus according to a first embodiment of the present invention. The compact two-stage granular moving-bed apparatus 2 comprises a vessel 20, a flow-corrective element 21, and a material supplying part 22. In the present embodiment, the vessel 20 comprises a first side structure 200, a second side structure 201, and a top side structure 202. The first side structure 200 and second side structure 201 are disposed opposite to each other in a horizontal direction (X-axis) respectively, while the top side structure 202 is coupled to an upper end of the first side structure 200 and an upper end of the second side structure 201, thereby forming a hollow interior 23 enclosed by the first side structure 200, second side structure 201, and top side structure 202.

The flow-corrective element 21 is disposed inside the hollow interior 23 for dividing the hollow interior 23 into a first channel 230 and a second channel 231, wherein the flow-corrective element 21 further has a first flow-corrective plate 210 and a second flow-corrective plate 211 coupled to the first flow-corrective plate 210 such that an included angle θ is formed therebetween. The filter material supplying part 22 is disposed on the top side structure 202 and is in communication with the hollow interior 23. In the present embodiment, the filter material supplying part 22 further includes a first provider 220 for providing a first granular material flowing through the first channel 230 and a second provider 221 for providing a second granular material flowing through the second channel 231, wherein the first provider 220 and second provider 221 respectively extends into the hollow interior 23, and respectively is movable along the vertical direction (Z axis) so that a vertical level of the outlet 222 of the first provider 220 and a vertical level of the outlet 223 of the second provider 221 is respectively adjustable.

Although the embodiment shown in FIG. 3 is a cross section view of the compact two-stage granular moving-bed apparatus, it is noted that the first provider 220 comprises a first plate 2201 and a second plate 2202 and the second provider 221 comprises a third plate 2211 and a fourth plate 2212 so that a space 225 and 226 for accommodating granular is formed. On the other hand, since the first provider 220 and second provider 221 respectively is movable along the vertical direction, in an embodiment shown in FIG. 3, an isolation 224 such as rollers is disposed for reducing the friction between the second plate 2202 and fourth plate 2212. Meanwhile, the level of the outlet 222 of the first provider 220 is higher than the level of the outlet 223 of the second provider 221.

It is noted that the first granular material or the second granular material can be a coarse filter media or a fine filter media. The first granular material or the second granular material can be, but should not be limited to, silica sand or other minerals, ceramic particles, activated carbon, or adsorbent, so as to clean up dust particles or adsorb contaminants such as nitric oxides, sulfides ($H_2S$ or $SO_x$), ammonia, alkali, or hydrogen chloride in the exhaust gas. In addition, in another combination, the first granular material may be selected as a filter media, and the second granular material may be selected as an adsorbent or catalyst, which is depending on the needs of the user.

In addition, the vessel 20 further comprises a gas inlet 203, a gas outlet 204, a first media outlet 205 and a second media outlet 206. The gas inlet 203, formed on the first side structure 200 and in communication with the hollow interior 23, is utilized to be an entrance of an exhaust gas 90, which has dust particles and contaminants such as nitric oxides, sulfides ($H_2S$ or $SO_x$), ammonia, alkali, or hydrogen chloride. The gas outlet 204, formed on the second side structure 201 and in communication with the hollow interior 23, is utilized to be an exit for a clean gas 91 passing through the first granular material flowing through the first channel 230 and the second granular material flowing through the second channel 231. The first media outlet 205 and the second media outlet 206 is respectively formed on the bottom of the vessel 20, and is respectively in communication with the hollow interior 23. In the present embodiment, the first media outlet 205 is in communication with the first channel 230 for being an exit of the first granular material while the second media outlet 206 is in communication with the second channel 231 for being an exit of the second granular material.

In the present embodiment illustrated in FIG. 3, the first side structure 200 has a first hopper wall 207, and the second side structure 201 has a second hopper wall 208. There exists an angle $\gamma_{in}$ between the vertical plane 27 and the first hopper wall 207 as well as between the vertical plane 27 and the first flow-corrective plate 210, while there also exists an angle $\gamma_{out}$ between the vertical plane 27 and the second hopper wall 208 as well as between the vertical plane 27 and the second flow-corrective plate 211 such that a part of the first channel 230 defined by the first flow-corrective plate 210 and the first hopper wall 207 forms a first convergent mass flow channel 232 while a part of the second channel 231 defined by the second flow-corrective plate 211 and the second hopper wall 208 forms a second convergent mass flow channel 233.

Figure 4:
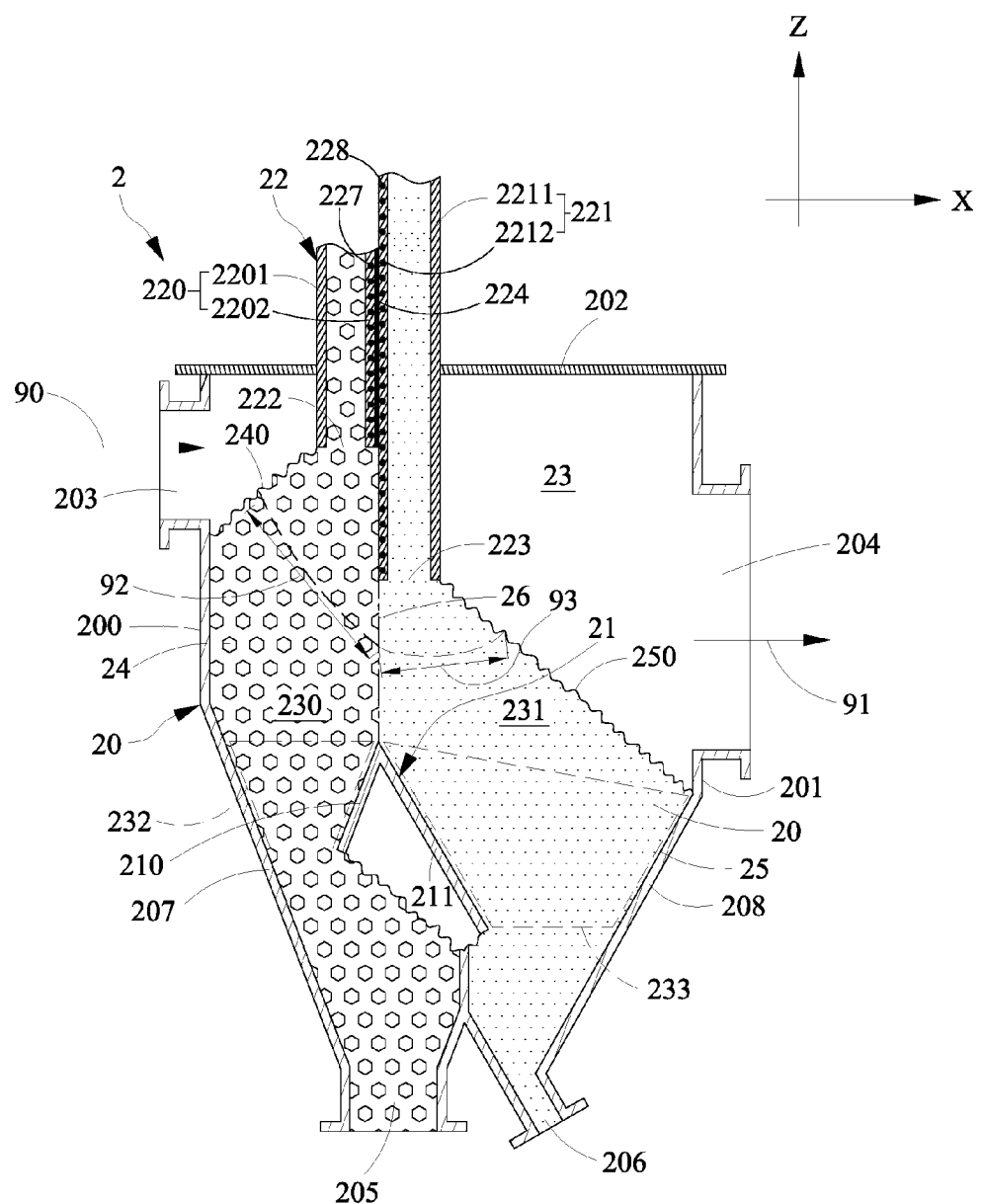
FIG. 4 illustrates the first and second granular material flowing inside the hollow interior of the first embodiment of the present invention.

Please refer to the FIG. 4 which illustrates the first and second granular material flowing inside the hollow interior of the first embodiment of the present invention. In the illustration shown in FIG. 4, the first granular material 24 represents a coarse filter media and the second granular material 25 represents a fine filter material, and there is high concentration of prevailing dust or other contaminants in the exhaust gas 90. In the current embodiment, the level of outlet 222 is higher than the level of outlet 223, and a free surface 240 of the first granular material 24 is higher than a free surface 250 of the second granular material such that the first flow path 92 is longer than the second flow path 93. It is noted that the flow path 92 represents the path that the exhaust gas 90, flowing into the vessel 20 from the gas inlet 203, passes through the first granular material 24 and thereby partially cleaned gas is formed. On the other hand, the flow path 93 represents the path that the partially cleaned gas passes through the second granular material 25 and thereby a clean gas 91 is formed to exit from the gas outlet 204. Since the flow path 92 is longer than the flow path 93, the first granular material 24 is capable of filtering out the most part of the dust or contaminants.

On the other hand, since the level of the outlet 223 of the second provider 221 is lower, the flow path 93 of the partially cleaned gas is shorter, thereby keeping the pressure drop of the clean gas 91 as low as possible such that the clean gas 91 can flow out the vessel smoothly without the necessity to increase the power for driving the exhaust gas 90 into the vessel 20 so as to save the energy cost. Meanwhile, the free surface 250 is larger than the free surface 240 so that the velocity of the clean gas 91 is lower for suppressing a phenomenon of the re-entrainment effect of finest dust particles. In addition, it is desirable that the first granular material (coarse filter media) 24 in the first channel 230 flows faster than the second granular material 25 (fine filter media) in the second channel 231 because the first granular material 24 will suffer the high loading of dust particles in the exhaust gas 90 during the filtering process. It is noted that the flow rate of the first granular material 24 and second granular material 25 can be adjusted, but should not be limited to, by controlling the size of the first media outlet 205 and the second media outlet 206. In the present embodiment, the size of the first media outlet 205 is larger than the size of the second media outlet 206.

Since the first convergent mass flow channel 232 is formed in the first channel 230 as well as the second convergent mass flow channel 233 is formed in the second channel 231, the first granular material 24 flowing through the first convergent mass flow channel 232 and the second granular material 25 flowing through the first convergent mass flow channel 233 are both in a state of mass flow according to Jenike theory, which is described in A. W. Jenike: Quantitative design of mass-flow bins. Powder Technology vol. 1, No. 4, 237-244 (1967), so that the stagnant zones can be prevented from being formed, or at least a quasi-stagnant zone can be kept on the surface of the first hopper wall 207 and first flow-corrective plate 210, and on the surface of the second hopper wall 208 and second flow-corrective plate 211. When mass flow exists in the first convergent mass flow channel 232 and second convergent mass flow channel 233, the boundary 26 between the first granular material 24 and the second granular material 25 is vertical. Thus, the cross-over effect will not be occurred on the boundary 26 between the first granular material 24 and the second granular material 25. It is noted that either one of the first plate 2201 and the second plate 2202, or both of the first plate 2201 and second plate 2202 can have a heat exchanger 227 disposed therein. Similarly, either one of the third plate 2211 and fourth plate 2212, or both of the third plate 2211 and the fourth plate 2212 can also have heat exchanger 228, thereby heating or cooling the first granular material 24 and the second granular material 25 separately.

Figure 5:
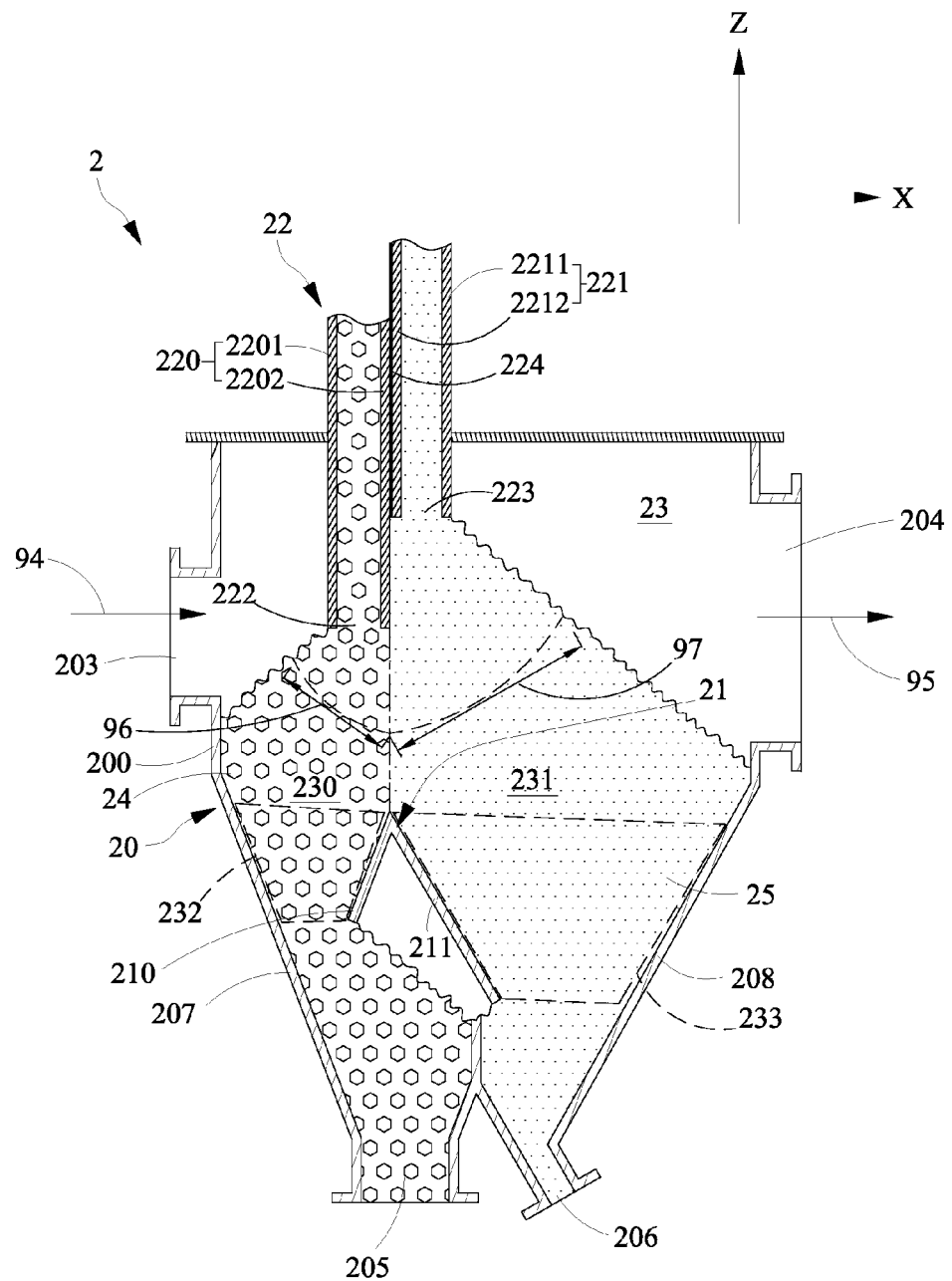
FIG. 5 illustrates a schematic sectional view of a compact two-stage granular moving-bed apparatus according to a second embodiment of the present invention.

Please refer to FIG. 5, which illustrates a schematic sectional view of a compact two-stage granular moving-bed apparatus according to a second embodiment of the present invention. In FIG. 5, the same parts are designated by the same numerals as illustrated in FIG. 3. The arrangements in the second embodiment are almost the same as the first embodiment shown in FIG. 3, and the difference is that the level of the outlet 222 of the first provider 220 is lower than the level of the outlet 223 of the second provider 221. The compact two-stage granular moving-bed 2 in FIG. 5 is for the exhaust gas 94 having lower concentrations of prevailing dust or other contaminants. The first granular material 24 is a coarse filter media, while the second granular material 25 is a fine filter media. The level of first granular material 24 (coarse filter media) is lower, so the flow path 96 of the exhaust gas 94 is shorter so as to keep pressure drop as low as possible while the exhaust gas 94 passes through the first granular material 24 and the level of second granular material 25 (fine filter media) is higher so the flow path 97 is longer so as to filtering out the dust or contaminants while partially cleaned gas passing through the second granular material 25. Meanwhile, it is desirable that the flow rate of second granular material 25 flowing through the second channel 231 is slower than the flow rate of the first granular material 24 flowing through the first channel 230 so that the second granular material 25 (fine filter media) is capable of removing the finest particulates and capturing contaminants. Similarly, it is noted that the flow rate of the first granular material 24 and second granular material 25 can be adjusted, but should not be limited to, by controlling the size of the first media outlet 205 and the second media outlet 206. In the present embodiment, the size of the first medial outlet 205 is larger than the size of the second media outlet 206.

Figure 6:
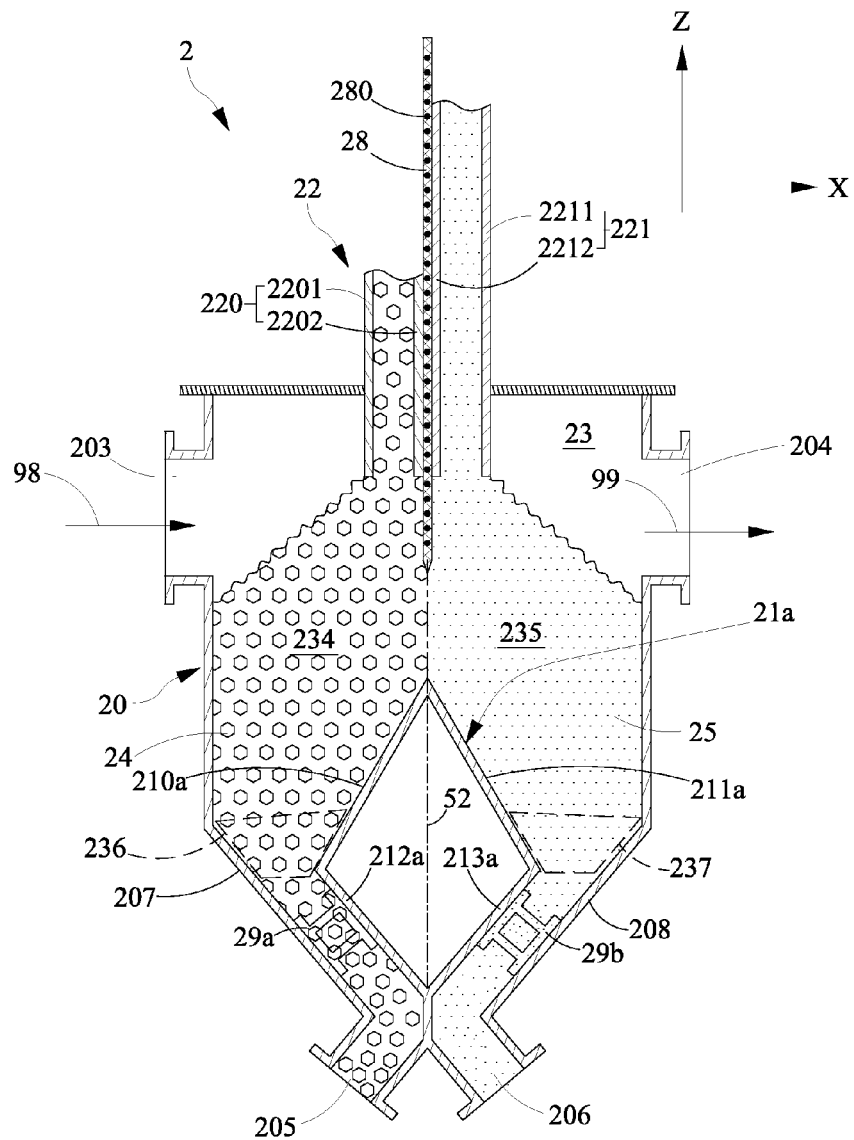
FIG. 6 illustrates a schematic sectional view of a compact two-stage granular moving-bed apparatus according to a third embodiment of the present invention.

Please refer to FIG. 6 which illustrates a schematic sectional view of a compact two-stage granular moving-bed apparatus according to a third embodiment of the present invention. In the embodiment shown in FIG. 6, the same parts are designated by the same numerals as illustrated in FIG. 3. The main differences between the embodiments in FIG. 6 and in FIG. 3 are that the embodiment in FIG. 6 has symmetric arrangement of flowing channels 234 and 235, a vertical plate 28, and different type of flow-corrective element 21a. The first channel 234 and second channel 235 defined in the hollow interior 23 are arranged symmetrically. The vertical plate 28 is disposed between the first provider 220 and the second provider 221, and the vertical plate 28 is capable of being moved upwardly and downwardly along a vertical direction (Z direction) in the hollow interior 23 so as to adjust the flow path with respect to the exhaust gas 98. Taking the illustration shown in FIG. 7A and FIG. 7B for example, by means of controlling the level of the vertical plate 28, the flow path 50 in FIG. 7A that the exhaust gas 98 passing through the first granular material 24 and the second granular material 25 is longer than the flow path 51 shown in FIG. 7B.

Back to FIG. 6, in addition, the vertical plate 28 in the present embodiment is capable of being served as a heat exchanger for cooling or heating the first granular material 24 and the second granular material 25 inside the hollow interior 23. In an embodiment of the vertical plate 28, a hollow space is formed therein so as to provide to accommodate a heat exchanger 280 such as heating coil, or a circulation conduit whereby the coolant or heating liquid is conducted so as to heat or cool the first granular material and second granular material separately or simultaneously. In case of heating or cooling the first granular material 24 and second granular material 25 separately, it can be implemented by disposing two isolated heat exchangers inside the vertical plate 28. It is noted that the heating or cooling device can be implemented through means known by the one having ordinary skill in the art; therefore it will not be described in detail hereinafter.

Back to FIG. 6, the flow-corrective element 21a further comprises an upper flow-corrective part having a first flow-corrective plate 210a and a second flow-corrective plate 211a symmetrically arranged on respective side of a z-direction centerline 52 of the flow-corrective element 21a, and a lower flow-corrective part having a third flow-corrective plate 212a and fourth flow-corrective plate 213a symmetrically arranged on respective side of the z-direction centerline 52 of the flow-corrective element 21a, and an end of the first flow-corrective plate 210a is coupled to an end of the third flow-corrective plate 212a, while an end of the second flow-corrective plate 211a is coupled to an end of the fourth flow-corrective plate 213a. In the present embodiment, a part of the first channel 234 defined by the first flow-corrective plate 210a and the first hopper wall 207 forms a first convergent mass flow channel 236 while a part of the second channel 235 defined by the second flow-corrective plate 211a and the second hopper wall 208 forms a second convergent mass flow channel 237. Meanwhile, a first support 29a is disposed between the third flow-corrective plate 212a and the first hopper wall 207 while a second support 29b is disposed between the fourth flow-corrective plate 213a and the second hopper wall 208 so that the flow-corrective element 21a can be supported by the first support 29a and the second support 29b.

In case of the embodiment shown in FIG. 6, the properties of first granular material 24 and the second granular material 25 are the same or similar to each other. For example, in the similar case with respect to the first granular material 24 and the second granular material 25, the first granular material 24 can be preprocessed by mixing with two or more kinds of granular filter media or inert granular media to have the same properties as the second granular material 25.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A compact two-stage granular moving-bed apparatus, comprising:

a vessel comprising a hollow interior enclosed by a first side structure, a second side structure, and a top side structure, and the vessel further including a gas inlet formed on the first side structure, a gas outlet formed on the second side structure, and a first media outlet and a second media outlet respectively formed on the bottom of the vessel, wherein the gas outlet, the gas inlet, the first media outlet and the second media outlet are in communication with the hollow interior;

a flow-corrective element, disposed inside the hollow interior, for dividing the hollow interior into a first channel and a second channel; and a filter material supplying part, coupled to the top side structure and communicated with the hollow interior, having a first provider for providing a first granular material flowing through the first channel and a second provider for providing a second granular material flowing through the second channel;

wherein an exhaust gas entering from the gas inlet in turn passes through the first and second granular material and exists from the gas outlet, and a vertical level of each first and second provider is adjustable so that a first flow path that the exhaust gas flows through the first granular material and a second flow path that the exhaust gas flow through the second granular material is respectively capable of being controlled.

2. The compact two-stage granular moving-bed apparatus according to claim 1, wherein the first channel and the second channel are formed asymmetrically inside the hollow interior.

3. The compact two-stage granular moving-bed apparatus according to claim 1, wherein the flow-corrective element has a first flow-corrective plate and a second flow-corrective plate, the first side structure has a first hopper wall, and the second side structure has a second hopper wall such that a part of the first channel defined by the first flow-corrective plate and the first hopper wall forms a first convergent mass flow channel while a part of the second channel defined by the second flow-corrective plate and the second hopper wall forms a second convergent mass flow channel.

4. The compact two-stage granular moving-bed apparatus according to claim 1, wherein the first granular material is a coarse filter media.

5. The compact two-stage granular moving-bed apparatus according to claim 4, wherein the second granular material is a fine filter media.

6. The compact two-stage granular moving-bed apparatus according to claim 1, wherein an outlet of the first provider is higher than an outlet of the second provider such that a free surface of the first granular material is higher than a free surface of the second granular material, thereby rendering the first flow path is longer than the second flow path.

7. The compact two-stage granular moving-bed apparatus according to claim 6, wherein the free surface of the second granular material is larger than the free surface of the first granular material.

8. The compact two-stage granular moving-bed apparatus according to claim 1, wherein an outlet of the first provider is lower than an outlet of the second provider such that a free surface of the first granular material is lower than a free surface of the second granular material, so the first flow path is shorter than the second flow path.

9. The compact two-stage granular moving-bed apparatus according to claim 1, wherein a flow rate of the first granular material in the first channel is faster than a flow rate of the second granular material in the second channel.

10. The compact two-stage granular moving-bed apparatus according to claim 1, wherein the first granular material is a filter media.

11. The compact two-stage granular moving-bed apparatus according to claim 1, wherein the second granular material is an adsorbing material.

12. The compact two-stage granular moving-bed apparatus according to claim 1, wherein the first granular material and the second granular material are selected as silica sand, activated carbon, adsorbent, and catalyst.

13. The compact two-stage granular moving-bed apparatus according to claim 1, wherein the first channel and the second channel are formed symmetrically inside the hollow interior.

14. The compact two-stage granular moving-bed apparatus according to claim 13, wherein a vertical plate is disposed between the first provider and the second provider, and the vertical plate is capable of being moved upwardly and downwardly along a vertical direction in the hollow interior so as to adjust the first flow path and the second flow path.

15. The compact two-stage granular moving-bed apparatus according to claim 14, wherein a heat exchanger is disposed inside the vertical plate for cooling or heating the first granular material and the second granular material inside the hollow interior.

16. The compact two-stage granular moving-bed apparatus according to claim 13, wherein the flow-corrective element further comprises an upper flow-corrective part having a first flow-corrective plate and a second flow-corrective plate symmetrically arranged on respective side of a z-direction centerline of the flow-corrective element, and a lower flow-corrective part having a third flow-corrective plate and fourth flow-corrective plate symmetrically arranged on respective side of the z-direction centerline of the flow-corrective element, and an end of the first flow-corrective plate is coupled to an end of the third flow-corrective plate, while an end of the second flow-corrective plate is coupled to an end of the fourth flow-corrective plate.

17. The compact two-stage granular moving-bed apparatus according to claim 16, wherein the first side structure has a first hopper wall, and the second side structure has a second hopper wall such that a part of the first channel defined by the first flow-corrective plate and the first hopper wall forms a first convergent mass flow channel while a part of the second channel defined by the second flow-corrective plate and the second hopper wall forms a second convergent mass flow channel.

18. The compact two-stage granular moving-bed apparatus according to claim 16, wherein a first support is disposed between the third flow-corrective plate and the first hopper wall while a second support is disposed between the fourth flow-corrective plate and the second hopper wall.

19. The compact two-stage granular moving-bed apparatus according to claim 1, wherein the first provider comprises a first plate and a second plate, and the second provider comprises a third plate and a fourth plate, and a isolation is disposed between the second plate and the fourth plate for reducing friction between the second plate and the fourth plate.

20. The compact two-stage granular moving-bed apparatus according to claim 1, wherein the first provider comprises a first plate and a second plate and the second provider comprises a third plate and a fourth plate and a heat exchanger of the first provider is disposed inside the first plate or the second plate, while a heat exchanger of the second provider is disposed inside the third plate or fourth plate.

* * * * *